Aug. 11, 1964
A. A. McGEE
3,144,589
CONTROL SYSTEM
Filed Sept. 16, 1959
2 Sheets-Sheet 1
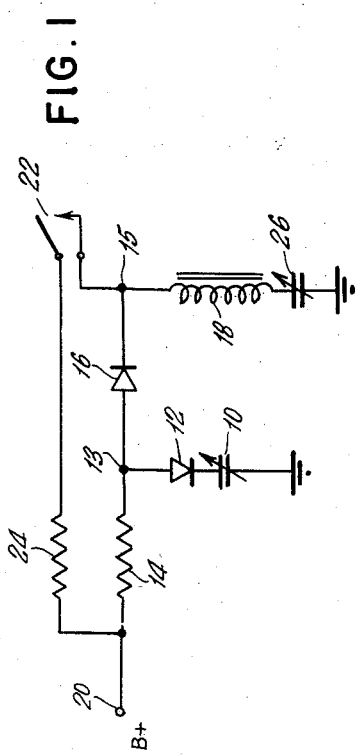
INVENTOR.
Archie A. McGee
BY Isidore Match
ATTORNEY Aug. 11, 1964          A. A. McGEE          3,144,589
                       CONTROL SYSTEM
Filed Sept. 16, 1959                    2 Sheets-Sheet 2
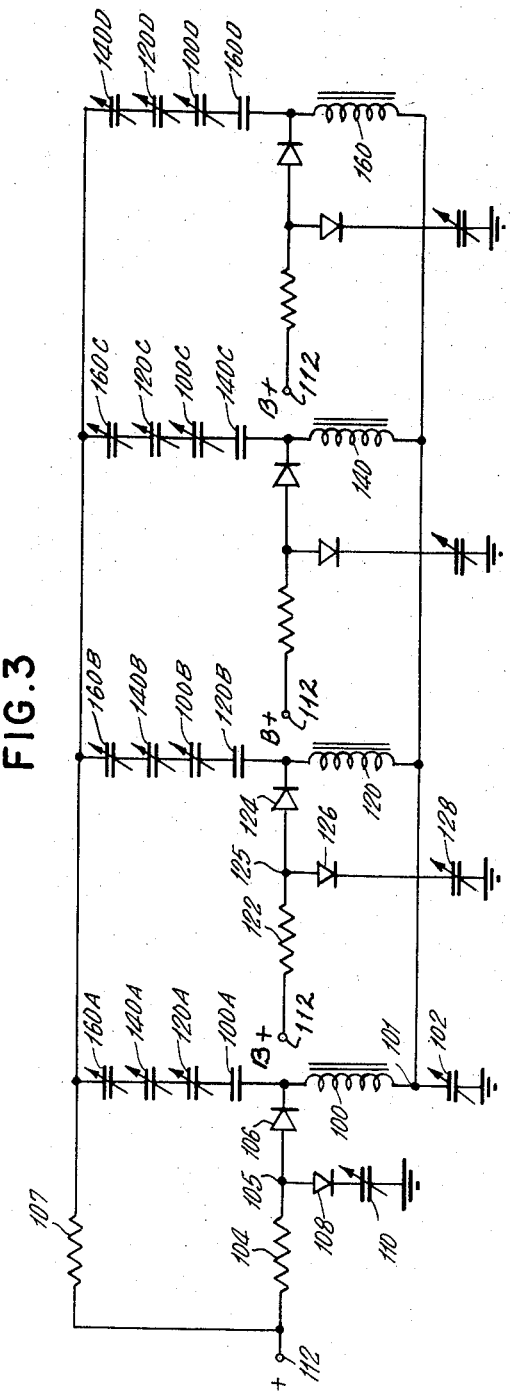
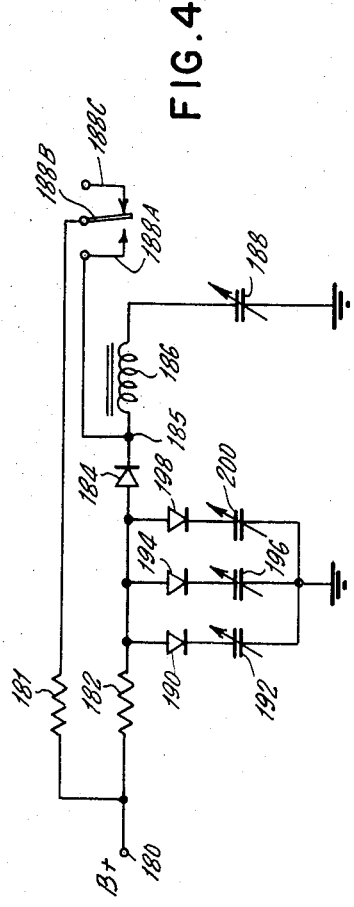
INVENTOR.
Archie A. McGee
BY Isidore Match
ATTORNEY 3,144,589
CONTROL SYSTEM
Archie A. McGee, Lynchburg, Va., assignor to General
Electric Company, a corporation of New York
Filed Sept. 16, 1959, Ser. No. 840,278
9 Claims. (Cl. 317—137)

This invention relates to control systems. More particularly, it relates to relay systems for selectively conditioning communication channels.

In many situations, such as in automatic telephony, it may be desired to condition a chosen voice channel or a channel for remote or supervisory control in an arrangement where a great multiplicity of channels are present. In some of the situations, it may be desired to condition and maintain one or more channels at the same time. At other times, it may be desired to permit only one channel to be conditioned at one time and to provide a definite order of priority or precedence for given channels. In still another situation, it may be desired to permit only one circuit to be conditioned at one time without any priority requirement.

It is, accordingly, an object of this invention to provide a relay apparatus for selectively conditioning and maintaining at least one communication channel which is included in a plurality of such channels.

It is a further object to provide an apparatus in accordance with the preceding object for selectively conditioning one channel of a plurality of channels at one time and to maintain a definite order of priority in the conditioning of the respective channels.

It is another object to provide an apparatus in accordance with the preceding objects for selectively conditioning one channel of a plurality of channels without the presence of any requirement of priority for such conditioning.

It is still another object to provide an apparatus in accordance with the preceding objects for selectively conditioning a channel only upon the simultaneous occurrence of a plurality of conditioning signals.

The features of this invention which are believed to be new are set forth with particularity in the appended claims. The invention itself, however, may best be understood by reference to the following description when taken in conjunction with the accompanying drawings which show embodiments of a control system according to the invention.

In the drawings,

FIG. 1 is a schematic depiction of a circuit in accordance with the invention for locking in a relay, the energization of which conditions a channel for reception;

FIG. 2 is a diagram of a circuit including components such as depicted in FIG. 1 and providing a priority interlock system for one channel of a plurality of channels;

FIG. 3 is a diagram of a circuit for relay interlocking one channel in a given group of channels wherein no priority arrangement is present in the system; and FIG. 4 shows an arrangement, provided in accordance with the invention, where a coincidence of a plurality of signals is required to condition a single channel.

Referring now to FIG. 1 wherein there is shown a circuit for relay interlocking a voice channel in an automatic telephony system, the normally closed contacts 10 are located on a relay (not shown) which may be operated by a precision frequency tone. For example, such relay may be present in selective calling equipment which may be a tone receiver sensitive to only one frequency which is determined by the particular frequency that is used. The relay on which contacts 10 are physically mounted may have its coil connected in the plate circuit of a vacuum tube, the quiescent current of which is normally of a low value and which does not attain an appreciable value until the audio frequency to which the receiver is sensitive is applied to the tube. When the correct tone frequency is presented to the tone receiver, suitable circuits cause such relay to operate thereby opening contacts 10.

In considering the operation of the circuit of FIG. 1, normally the cathode of diode 12 is connected to a source of reference potential shown as ground in FIG. 1 through normally closed contacts 10. When the circuit is initially energized and the tone receiver is not receiving a tone, the voltage between the junction point 13 of resistor 14 and the anode of diode 12 and the junction point 15 of the cathode of diode 16 and relay 18 is that amount which is developed across diode 16 in the forward direction. In this state, such voltage is quite low, say about 0.5 volt or so. Since the voltage required to energize relay 18 is much greater, say about 100 volts, D.C., and since the voltage at the junction point 15 is much too low, relay 18 is not energized.

Now, when the proper tone is received by the tone receiver, contacts 10 open and the voltages at junction points 13 and 15 respectively tend to rise to the value of the voltage of the source of unidirectional potential 20 as limited by resistor 14. Thus, when the voltage at junction point 15 reaches the value necessary to energize relay 18, the latter energization causes contacts 22 associated therewith and which are normally open to close, the closing of contacts 22 sealing relay 18. At the end of the tone signal, contacts 10 resume their normally closed condition and the voltage at junction point 13 drops to its quiescent relatively low value. However, due to the presence of diode 16, poled as shown, the voltage at junction point 15 will be maintained at the necessary voltage to hold relay 15 in the energized condition, the voltage being applied from source 20 through resistor 24 and closed contacts 22. Of course, to maintain relay 18 in the energized state, the values of resistor 24 and the resistance of the coil of relay 18 have to be chosen with this end in view.

As stated above, when contacts 10 reclose, the voltage at junction point 13 drops to its normally quiescent low value. The degree of isolation of junction point 13 is determined by the reverse impedance characteristic of the type of diode 16 that is used. Relay 18 however will continue to remain energized, i.e., locked in by contacts 22 until its circuit is interrupted in some manner. For example in the circuit of FIG. 1, there are shown normally closed contacts 26 connected between the lower terminal of the coil of relay 18, and ground. Such contacts conveniently may be associated with a reset relay, a push button or any other type of circuit interrupting means. The opening of normally closed contacts 26 by such interruption disables relay 18 and the circuit is restored to its quiescent condition.

It is quite apparent that the lock-in circuitry for relay 18 may be utilized with one or any number of simultaneous tones. Resistor 14 is utilized to control the load on the potential source 20 and resistor 24 is utilized to adjust the voltage at junction point 15 to the required value.

Referring to FIG. 2 where there is shown a control system in accordance with the invention wherein there is a descending order of priority for a given channel in a plurality of channels, the basic component repeated therein is essentially the circuit of FIG. 1. Thus, the coil of the relay 30 has one terminal connected to ground through normally closed contacts 32 and its other terminal connected to normally open contacts 34. Connected in series with contacts 34 are normally closed contacts 36 which are also associated with relay 30. Connected between the potential source 50 and the junction 33 of the coil of relay 30 and contacts 34 is a series arrangement of a source load resistor 38 and a diode 40. A resistor 42 is provided between source 50 and the junction of contacts 34 and 36. Connected between the junction point 41 of resistor 38 and the anode of diode 40 and ground is a series arrangement of a diode 44 having its anode connected to the junction point 41 and its cathode connected through normally closed contacts 46 to ground.

The coil of a second relay 48 has one terminal connected to normally open contacts 52 associated therewith and its other terminal connected to the junction point 31 of the coil of relay 30 and contacts 32. Connected between the junction point 51 of the coil of relay 48 and contacts 52 and the supply source 50 is a series arrangement of a resistor 54 and a diode 56, a series arrangement of a diode 58 and normally closed contacts 60 being connected between junction point 55 and ground. Contacts 52 are connected to normally closed contacts 62 which are also associated with relay 48.

Examination of the circuit of FIG. 2 shows that the next two succeeding stages are similar to the first and second stages. In the third stage, the coil of relay 64 has one end connected to junction point 31 and its other end connected to normally open contacts 66. Connected between source 50 and the junction point 65 of contacts 66 and the coil of relay 64 is a series arrangement of a resistor 68 and a diode 70, the junction point 69 of resistor 68 and diode 70 being connected to ground through a series arrangement of a diode 72 and normally closed contacts 74. Contacts 66 are also connected to normally closed contacts 76 which are associated with the coil of relay 64.

In the fourth stage, the coil of relay 80 has one end connected to junction point 31 and its other end connected to normally open contacts 82 which are associated therewith, contacts 82 being connected to normally closed contacts 84. Source 50 is connected to the junction point 81 of the coil of relay 80 and contacts 82 through a series arrangement of a resistor 86 and a diode 88, the junction point 87 of resistor 86 and anode of diode 88 being connected to ground through the anode to cathode path of a diode 90 and normally closed contacts 92. These stages may be multiplied indefinitely as desired.

In considering the operation of the circuit of FIG. 2, in the quiescent state, junction point 33 is at substantially the same potential as junction point 41 as explained hereinabove in connection with the operation of the circuit of FIG. 1 whereby relay 30 is not energized and contacts 34 remain open. Similarly junction point 55 is at substantially the same potential as junction point 51, junction point 69 is at substantially the same potential as junction point 65 and junction point 87 is at substantially the same potential as junction point 81. Due to the presence of normally open contacts 52, 66 and 82, relays 48, 64 and 80 are also unenergized. Now let it be assumed that the proper frequency is received to open contacts 60. When such reception occurs, relay 48 is energized and sealed by the closing of contacts 52. Simultaneously, relay 30 remains unaffected and relays 64 and 80 are also not energized. With the closing of contacts 52, contacts 62 also associated with relay 48 open. Now, if the proper tone signal causes contacts 46 to open, relay 48 cannot be maintained in the energized state since the potential from supply source 50 cannot be applied to junction point 51 due to the consequent open condition of contacts 36. Thus relay 30 is sealed by contacts 34 and the other relays including relay 48 are unenergized.

While relay 30 is energized, no other channel can be conditioned for reception since no other relay can be locked in, by its own contacts. To disable relay 30, contacts 32 have to be opened by some interrupting means as explained hereinbefore.

In the circuit of FIG. 3 wherein only one channel may be conditioned at one time but wherein there is no priority, the separate contacts have not been arranged in the FIG. 3 to show their physical association but rather to show their functional operation. Thus the relays which are designated by numerals 100, 120, 140 and 160 have contacts associated therewith which are designated by letters A, B, C and D. Accordingly, operatively associated with relay 100 are contacts 100A, 100B, 100C and 100D. The other relays correspondingly have similar contacts operatively associated therewith.

In the circuit of FIG. 3, the coil of relay 100 has one terminal connected to ground through normally closed contacts 102, its other terminal being connected to the normally open contacts 100A associated therewith. The potential source 112 is connected to the junction 103 of contacts 100A and the coil of relay 100 through a series arrangement of a resistor 104 and the anode to cathode path of a diode 106, the junction 105 of resistor 104 and the anode of diode 106 being grounded through the anode to cathode path of a diode 108 and normally closed contacts 110. Similarly, source 112 is connected through a resistor 122 and the anode to cathode path of a diode 124 to the junction of the coil of relay 120 and normally open contacts 120B associated therewith. The junction 125 of resistor 122 and diode 124 is grounded through a series arrangement of the anode to cathode path of a diode 126 and normally closed contacts 128, etc. Resistor 107 is provided similarly as in the circuits of FIGS. 1 and 2 to maintain the proper voltage across an energized relay coil when it is intended to maintain such coil in the energized state.

In considering the operation of the circuit FIG. 3, let it be assumed that the proper tone is received to effect the openings of contacts 128. This will cause the energization of the coil of relay 120 with the consequent closing of normally open contacts 120B to effect the locking in of relay 120. As soon as relay 120 is energized, normally closed contacts 120A, 120C and 120D operatively associated with relay 120 open. Let it be assumed that while relay 120 is in the energized state, a tone is received to open contacts 110. The energization of relay 100 ensuing from such opening causes normally open contacts 100A to close and contacts 100B, 100C and 100D to open. Consequently, when normally closed contacts 100B open, relay 120 is de-energized because of the interruption of the holding path thereto from the source 112. Relay 100 will now remain energized until either contacts 102 are opened by an interruption or another set of receiver contacts are opened.

In FIG. 4, there is shown a circuit in accordance with the invention for conditioning a communication channel in response to the simultaneous reception of a plurality of channel conditioning signals. The voltage from the unidirectional potential source 180 is applied through a series arrangement of a supply load resistor 182 and the anode to cathode path of a diode 184, the coil of a relay 186, and normally closed contacts 188 to ground. Associated with relay 186, are contacts 188 A, B, and C, contacts 188B and 188C normally assuming the closed position when the circuit is in the quiescent state and contacts 188A and B assuming the closed position when relay 186 is energized. Connected between the junction of resistor 182 and the anode of diode 184 is a parallel arrangement comprising three arms, each arm respectively comprising a series arrangement of a diode 190 and normally closed contacts 192, a series arrangement of a diode 194 and normally closed contacts 196 and a series arrangement of a diode 198 and normally closed contacts 200, the parallel arrangement being connected to ground. Source 180 is also connected to contact 188B through a resistor 181.

In the operation of the circuit of FIG. 4 with contacts 188B and 188C in their normally closed position and the coil of relay 186 unenergized, the voltage at the junction point 185 of the cathode of diode 184 and the coil of relay 186 is substantially the same as the voltage at the junction of resistor 182 and the anode of diode 184. It is only when all three sets of contacts 192, 196 and 200 are caused to open due to the simultaneous reception of three tone signals that the voltage at junction point 185 attains a high enough level to permit relay 186 to seal itself by the opening of contacts 188B and 188C and the closing of contacts 188A and 188B, the presence of diode 184 maintaining such sealing.

While there have been shown particular embodiments of this invention, it will, of course, be understood that it is not wished to be limited thereto since different modifications may be made both of the circuit arrangements and in the instrumentalities employed, and it is contemplated in the appended claims to cover any such modifications as fall within the true spirit and scope of the invention.

What is claimed as new and desired to be secured by Letters Patent of the United States is:

1. In a relay control system the combination comprising:
   (a) a relay,
   (b) means for establishing a first normally conductive path between said relay and a source of energizing potential through a unidirectional conductive device,
   (c) a control circuit coupled to the first conductive path between the source and the unidirectional device including a second normally conductive path to reduce the energizing potential applied to the unidirectional device and to the relay to a value less than the value required to energize the relay,
   (d) means to disable the control circuit upon occurrence of an event to raise the potential applied to said unidirectional device and said relay to a value sufficient to energize said relay,
   (e) a third path between said source and said relay including a normally open contact associated with and responsive to said relay, said contact closing upon energization of said relay to complete said third path for supplying energizing potential to said relay and to disable said first normally conductive path by reverse-biasing said unidirectional device so that subsequent enabling of said control circuit, by termination of said event, cannot reduce the energizing potential to said relay,
   (f) and further contact means connected in circuit with said relay for interrupting said second path and de-energizing said relay.

2. In a relay control system, according to claim 1, wherein said control circuit includes a second unidirectional means poled in the forward direction of current flow with respect to said source, and said means to disable said control circuit includes normally closed contacts which open in response to the occurrence of said event.

3. An apparatus comprising a plurality of serially arranged relay controlling channels, each of said channels comprising:
   (a) a relay,
   (b) means for establishing a first normally conductive path between said relay and a source of energizing potential through a unidirectional conductive device,
   (c) a control circuit coupled to the first conductive path between the source and the unidirectional device including a second normally conductive path to reduce the energizing potential applied to the unidirectional device and to the relay to a value less than the value required to energize the relay,
   (d) means to disable the control circuit upon occurrence of an event to raise the potential applied to said unidirectional device and said relay to a value sufficient to energize said relay,
   (e) a third path between said source and said relay including a normally open contact associated with and responsive to said relay, said contact closing upon energization of said relay to complete said third path for supplying energizing potential to said relay and to disable said first normally conductive path by reverse-biasing said unidirectional device so that subsequent enabling of said control circuit, by termination of said event, cannot reduce the energizing potential to said relay,
   (f) and further contact means connected in circuit with said relay for interrupting said second path and de-energizing said relay,
   (g) normally closed contacts associated with each relay and connected to the next succeeding channel and responsive to the energization of the associated relay, the opening of said last named contacts preventing the relay of the next succeeding channel from being connected to said source by said second path so that each channel in said arrangement has a priority higher than the next succeeding channel.

4. A relay control system, according to claim 3, wherein the control circuit in each of said channels includes a further unidirectional device poled in the forward direction of current flow with respect to said source, and the means to disable the control circuits in each of said channels including normally closed contacts which open in response to the occurrence of said event.

5. In an apparatus comprising a plurality of serially arranged channels, each of said channels comprising an electromagnetic relay, the energization of which operatively conditions a channel, and a potential source for energizing said relays, means for normally maintaining each of said relays in the unenergized state and for maintaining a given relay in the energized state for the duration of a channel conditioning event comprising a plurality of first diodes, each of said first diodes connecting said source to different ones of said relays in a first path, said diodes being poled in the forward direction of current flow with respect to said source, respective means intermediate said source and each of said diodes for presenting a low impedance path to current flow from said source, the current flow in said low impedance path maintaining the voltage applied from said source to said relays at a level insufficient to energize said relays, said last named means including means responsive to the initiation of a channel conditioning event for converting said low impedance path to a high impedance path to current from said source whereby sufficient voltage is applied from said source to said relay to energize said relay, a set of normally open contacts associated with each of said relays which close in response to the energization of a relay to contact an energized relay to said source by a second path, a plurality of sets of first normally closed contacts associated with each relay, each of said first contacts being connected in the circuit with a different discrete relay and the normally open contacts associated with each of said relays and said source whereby upon the energization of a given relay, the consequent opening of the first closed contacts associated therewith prevents the connecting of another relay to said source by said second path, and means responsive to the end of said event for disconnecting the energized relay from said source through said second path.

6. In an apparatus as defined in claim 5 wherein said respective means for presenting said impedance paths comprises series arrangements of second diodes poled in the forward direction of current flow with respect to said source and second normally closed contacts which open in response to the initiation of said event.

7. In an apparatus as defined in claim 6 wherein said means for disconnecting said relays from said source through said second path comprises normally third closed contacts in circuit with said relays which open in response to the ending of said event.

8. In a relay control system, according to claim 1, wherein the means to disable the control circuit includes means responsive only to the simultaneous occurrence of a plurality of events.

9. A relay control system, according to claim 8, wherein the means responsive to the simultaneous occurrence of a plurality of events comprises a parallel arrangement of a plurality of normally closed contacts which open upon the reception of the plurality of signals representative of said events.

References Cited in the file of this patent
UNITED STATES PATENTS

| | | |
|---|---|---|
| 584,463 | Creelman | June 15, 1897 |
| 1,248,942 | Sprague | Dec. 4, 1917 |
| 2,057,384 | Lamb | Oct. 13, 1936 |
| 2,602,150 | Hauck | July 1, 1952 |
| 2,712,101 | Salati | June 28, 1955 |
| 2,716,206 | Salati | Aug. 23, 1955 |
| 2,759,130 | Brewer | Aug. 14, 1956 |
| 2,847,662 | Lindgren | Aug. 12, 1958 |

OTHER REFERENCES

"Logical Design of Electrical Circuits," by Higonnet and Grea, McGraw-Hill 1958, section 9–7, pages 122, 123, 124.